United States Patent
Gupta et al.

(10) Patent No.: US 10,592,613 B2
(45) Date of Patent: Mar. 17, 2020

(54) DIALOG FLOW EVALUATION

(71) Applicant: International Business Machines Corporation, Armonk, NY (US)

(72) Inventors: Ajay Kumar Gupta, New Delhi (IN); Pratyush Kumar, Chennai (IN); Sachindra Joshi, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/920,116

(22) Filed: Mar. 13, 2018

(65) Prior Publication Data
US 2019/0286698 A1    Sep. 19, 2019

(51) Int. Cl.
| | |
|---|---|
| *H04L 12/58* | (2006.01) |
| *G06Q 10/06* | (2012.01) |
| *G06F 17/27* | (2006.01) |
| *G06N 3/00* | (2006.01) |
| *G06F 17/18* | (2006.01) |

(52) U.S. Cl.
CPC ............ *G06F 17/279* (2013.01); *G06F 17/18* (2013.01); *G06N 3/006* (2013.01); *G06Q 10/0633* (2013.01); *H04L 51/02* (2013.01)

(58) Field of Classification Search
CPC .......... G06Q 10/0633; G06Q 10/06393; H04L 51/02; H04M 2203/401
See application file for complete search history.

(56) References Cited

U.S. PATENT DOCUMENTS

| | | | |
|---|---|---|---|
| 2016/0316059 A1 | 10/2016 | Nuta et al. | |
| 2016/0352657 A1* | 12/2016 | Galley | .................. H04L 51/02 |
| 2017/0180284 A1 | 6/2017 | Smullen et al. | |
| 2017/0243134 A1 | 8/2017 | Housman | |
| 2018/0357096 A1* | 12/2018 | McConnell | ........... G06F 9/4843 |

FOREIGN PATENT DOCUMENTS

CN        106815321 A      6/2017

OTHER PUBLICATIONS

Chatbase, "Analyze and optimize bots more easily", 10 pages, Accessed on Jan. 4, 2018, https://chatbase.com/welcome.
Dashbot, "Actionable Bot Analytics", 7 pages, Accessed on Jan. 4, 2018, https://www.dashbot.io/.

* cited by examiner

*Primary Examiner* — Thomas H Maung
(74) *Attorney, Agent, or Firm* — Ference & Associates LLC

(57) ABSTRACT

One embodiment provides a method, including: receiving information corresponding to a dialog flow between a conversational agent and a user; identifying, from the received information, dialog states, each dialog state corresponding to a possible response by the conversational agent; classifying a set of the identified dialog states as grounded dialog states, wherein the classifying comprises (i) receiving scoring input representing a desirability for each of the grounded dialog states and (ii) generating a score vector; assigning a score vector to each of the identified dialog states other than the grounded dialog states, wherein the assigning a score vector comprises extrapolating the score vector of a grounded dialog state to dialog states that the grounded dialog state is dependent upon; and computing an aggregate score vector for the dialog flow, wherein the aggregate vector score identifies an overall desirability of the dialog flow.

17 Claims, 4 Drawing Sheets

DIALOG FLOW EVALUATION

BACKGROUND

When a user has a problem or question the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as a text-based output. Digital or virtual assistants may include assistants that receive voice input, process the voice input, and then provide a responsive output, for example, by audio, by performing a function, or the like. Conversational agents provide a method for a user to receive assistance with a problem or query that does not require a human user. The conversational agents are programmed to process input and provide output responsive to the input in a manner similar to how another human would engage in the conversation.

BRIEF SUMMARY

In summary, one aspect of the invention provides a method, comprising: receiving information corresponding to a dialog flow between a conversational agent and a user; identifying, from the received information, dialog states, wherein each dialog state corresponds to a possible response by the conversational agent; classifying a set of the identified dialog states as grounded dialog states, wherein the classifying comprises (i) receiving scoring input representing a desirability for each of the grounded dialog states and (ii) generating a score vector based upon the received scoring input for each of the grounded dialog states; assigning a score vector to each of the identified dialog states other than the grounded dialog states, wherein the assigning a score vector comprises extrapolating the score vector of a grounded dialog state to dialog states that the grounded dialog state is dependent upon; and computing an aggregate score vector for the dialog flow, wherein the aggregate vector score identifies an overall desirability of the dialog flow.

Another aspect of the invention provides an apparatus, comprising: at least one processor; and a computer readable storage medium having computer readable program code embodied therewith and executable by the at least one processor, the computer readable program code comprising: computer readable program code configured to receive information corresponding to a dialog flow between a conversational agent and a user; computer readable program code configured to identify, from the received information, dialog states, wherein each dialog state corresponds to a possible response by the conversational agent; computer readable program code configured to classify a set of the identified dialog states as grounded dialog states, wherein the classifying comprises (i) receiving scoring input representing a desirability for each of the grounded dialog states and (ii) generating a score vector based upon the received scoring input for each of the grounded dialog states; computer readable program code configured to assign a score vector to each of the identified dialog states other than the grounded dialog states, wherein the assigning a score vector comprises extrapolating the score vector of a grounded dialog state to dialog states that the grounded dialog state is dependent upon; and computer readable program code configured to compute an aggregate score vector for the dialog flow, wherein the aggregate vector score identifies an overall desirability of the dialog flow.

An additional aspect of the invention provides a computer program product, comprising: a computer readable storage medium having computer readable program code embodied therewith, the computer readable program code executable by a processor and comprising: computer readable program code configured to receive information corresponding to a dialog flow between a conversational agent and a user; computer readable program code configured to identify, from the received information, dialog states, wherein each dialog state corresponds to a possible response by the conversational agent; computer readable program code configured to classify a set of the identified dialog states as grounded dialog states, wherein the classifying comprises (i) receiving scoring input representing a desirability for each of the grounded dialog states and (ii) generating a score vector based upon the received scoring input for each of the grounded dialog states; computer readable program code configured to assign a score vector to each of the identified dialog states other than the grounded dialog states, wherein the assigning a score vector comprises extrapolating the score vector of a grounded dialog state to dialog states that the grounded dialog state is dependent upon; and computer readable program code configured to compute an aggregate score vector for the dialog flow, wherein the aggregate vector score identifies an overall desirability of the dialog flow.

A further aspect of the invention provides a method, comprising: accessing at least one dialog model corresponding to a dialog assistant, wherein the at least one dialog model identifies a dialog flow between the dialog assistant and a user; identifying dialog states within the dialog model, wherein the dialog states correspond to responses provided by the dialog assistant; receiving input scoring each of at least a portion of the identified dialog states, wherein the score for each dialog state identifies a desirability of the dialog state; scoring, based upon the score of the scored dialog states, each of the remaining identified dialog states, wherein the scoring comprises statistically generating a score for each of the remaining identified dialog states based upon the dependence of the scored dialog states to each of the remaining identified dialog states; and generating, using the scored dialog states, an aggregate score for the at least one dialog model by weighting the score of each dialog state based upon a frequency of occurrence of the dialog state and averaging the weighted dialog state scores.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
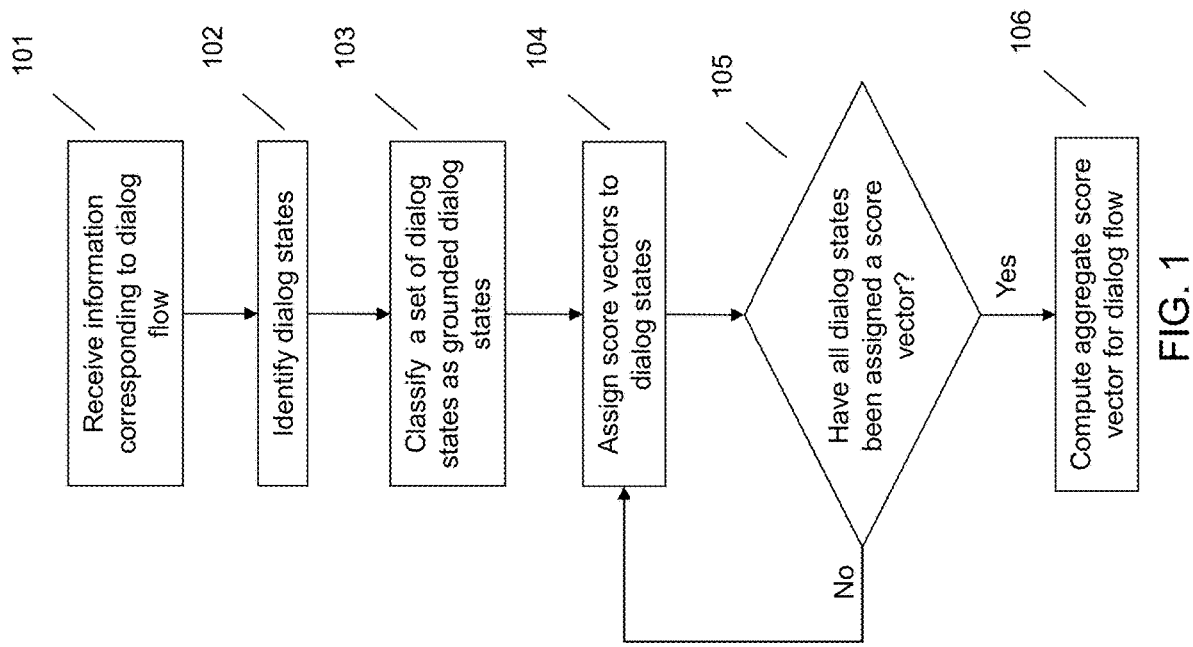
FIG. 1 illustrates a method of evaluating the health of a dialog flow.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The artificial intelligence that conversational agents use has become better allowing the conversation to become more accurate and closer to a conversation with another person. For example, the natural language generation and understanding has improved so that the conversational agent system can more accurately identify the user request and provide a more accurate response or result. Additionally, using data analytics and collaborative filtering has also made the conversation system more accurate and more human-like. A conversational agent is programmed or designed by a conversational agent designer or programmer who provides the design of the dialog flow. The dialog flow includes multiple nodes that represent a dialog state identifying a possible response that can be provided by the conversational agent. As the conversation progresses, the conversational agent processes input received from a user and accesses a node within the dialog flow that is responsive to the received input. Thus, the conversational agent designer creates the nodes and provides an algorithm to the conversational agent so that the conversational agent can select and traverse nodes of the dialog flow.

However, there is no current technique for a conversational agent designer or programmer to determine how effective, desirable, or good the dialog flow design functions. In other words, there is no current method for identifying how responsive the conversational agent is with respect to input provided by a user, determining whether queries are being answered using the dialog flow design, or the like. Additionally, because no technique exists for evaluating the effectiveness of the conversational agent dialog flow design, there is also no technique for a designer to understand what needs to be changed with regards to the dialog flow that would result in an improved user experience.

Accordingly, an embodiment provides a system and method for scoring or evaluating a dialog flow. The system may receive information corresponding to a dialog flow between a conversational agent and a user. This information may include a model of the dialog flow or dialog logs associated with previous conversations between the conversational agent and one or more users. From the information the system can identify the dialog states associated with the dialog flow of the conversational agent. The dialog states correspond to the different responses that can be provided by the conversational agent. Therefore, the dialog states are provided in the dialog model or can be identified from the dialog logs based upon responses provided by the conversational agent.

The system then classifies a set of the dialog states as grounded dialog states. The grounded dialog states are those dialog states that are scored by a user, for example, the conversational agent designer, automatically by the system, or a combination thereof. The score indicates a desirability of a response that corresponds to the dialog state. For example, a response that is associated with passing the user to a human agent may be an undesirable response because it indicates that the conversational agent is unable to assist the user. On the other hand, a response that is associated with a resolution of the user's query or problem may be a desirable response. Based upon the score provided by the user, the system can generate a score vector for the dialog state. The score vector may include multiple components. One component may include the desirability of the dialog state. Another component may be based upon a predetermined feature of dialog state. A predetermined feature may include an expected future response or hand-off, for example, a probability of the response resulting in handing the conversation off to a human agent, a probability of the response resulting in successful resolution, and the like.

Using the score vectors of the grounded dialog states, the system can assign score vectors to the remaining dialog states by extrapolating the score vector of the grounded dialog states to the remaining dialog states. Once all the dialog states have been assigned score vectors, the system may generate an aggregate vector score for the dialog flow. The aggregate score vector identifies the overall health of the dialog flow. In other words, the aggregate score vector identifies the effectiveness of the dialog flow, thereby providing a method of evaluation of the dialog flow of the conversational agent.

Such a system provides a technical improvement over current conversational agent design systems by providing a technique for evaluating a conversational agent dialog flow design. The systems and techniques as described herein provide a mechanism that allows evaluation of the design based upon responses of the conversational agent to user inputs. The dialog states within the dialog flow are scored, thereby allowing for computation of an aggregate score for the dialog flow. The aggregate score provides a feedback mechanism that indicates not only the health of the dialog flow, but also identifies a frequency of responses by the conversational agent. The system may use the aggregate score to identify possible dialog states that should be modified to result in a more desirable outcome by the conversational agent. The system also provides a mechanism that allows for identification of a most likely response by the conversational agent, which then allows the conversational agent to prepare for that response. These mechanisms provide an enhanced user experience. Thus, the systems and methods as described herein provide for a dialog flow design evaluation that is not possible using conventional methods and techniques because such a system does not currently exist.

FIG. 1 illustrates a method for evaluating the dialog flow of a conversational agent. At 101 the system receives information corresponding to a dialog flow between a conversational agent and a user. Receiving the information may include a user providing the information to the system, for example, uploading the information to the system, providing the information to a data storage location accessible by the system, or the like. Alternatively, the system may proactively capture or obtain the information, for example, by accessing a repository associated with the conversational agent, running as a background application with the conversational agent, or the like.

The information may include a dialog or conversation model corresponding to the conversational agent. A dialog or conversation model may include the model created by the programmer or designer that identifies the different dialog nodes that correspond to possible responses that can be provided by the conversational agent. The information may include dialog or conversation logs that correspond to previously completed conversations between the conversational agent and users of the conversational agent. These dialog logs may be captured each time a user accesses the conversational agent. The dialog logs identify the input provided by the user and then the responses provided by the user. The system may also receive both or a combination of the dialog model and the dialog logs. For example, the system may receive the dialog model and then use the dialog logs to determine a frequency of access of a particular node within the dialog model.

At 102 the system may identify, from the received information, dialog states. Dialog states correspond to different responses that may be provided by a conversational agent. These dialog states may be represented by nodes within the dialog model. Accordingly, in the case that a model is accessible to or provided to the system, to identify the dialog states the system may simply read from the model and identify the nodes within the model. Alternatively or additionally, the dialog states may be identified from the dialog logs. The system may analyze the dialog logs and identify responses provided by the conversational agent. The system may then classify each of these responses to a dialog state. In other words, since dialog states correspond to possible responses provided by the conversational agent, the system can attribute a response provided by the conversational agent to a dialog state. Using a plurality of dialog logs, the system can identify the different dialogs states that are included in the design of the conversational agent. In other words, with a plurality of dialog logs the system can generate a type of dialog model for the conversational agent. Additionally, the dialog logs provide an indication of a frequency of occurrence of each of the dialog states. In other words, the dialog logs provide an indication of how often a dialog state occurs during conversations with a user.

At 103 the system may classify a set of the identified dialog states as grounded dialog states. A user provides scoring input for some of the dialog states identified at 102. These dialogs states are then classified as grounded dialog states. The scoring input may be provided by a user, for example, the conversational agent designer or programmer. The scoring input identifies the desirability of the dialog state. In other words, the scoring input identifies whether the response associated with the dialog state is a desired response. For example, a dialog state that results in a hand-off of the conversation to a human agent may be undesirable. On the other hand, a dialog state that results in a successful resolution of the user's problem or query may be considered a desirable dialog state. As another example, a dialog state that leads to another response by the conversational agent may be considered a neutral dialog state. As another example, a dialog state that results in a complaint by the user may be considered an undesirable dialog state. It should be understood that these are merely examples and a variety of criteria may be used to determine if the dialog state is desirable, undesirable, or somewhere in between.

The scoring input may be provided in a variety of formats. For example, the scoring input may be provided as a number in a range, for example, between 0 and 1 or between 0 and 100, where 0 indicates an undesirable state and 1 or 100 indicates a desirable state. As another example, the scoring input may identify the dialog state as undesirable, desirable, or as a degree of desirability. The system may then assign a score to the dialog state. The scoring input may also be provided on a sliding scale, for example, the input may be provided using a slider or other indicator. The scoring input may also be derived by the system based upon responses by the user to the conversational agent. For example, if the user compliments the conversational agent, the system may identify the response provided by the conversational agent that resulted in the compliment as a desirable response. Similarly, if the user provides a correction to the conversational agent, the system may identify the response provided by the conversational agent that resulted in the correction as an undesirable response.

Once the scoring input has been received the system generates a score vector for the grounded dialog state based upon the scoring input. The score vector is a normalized vector representing orthogonal features of the dialog state. The score vector is generated by normalizing the scoring input and combining this normalized scoring input with a feature of the dialog state. A feature of a dialog state represents a probability of a predetermined response by the conversational agent. The predetermined response used for the score vector may include a response of interest to a user. For example, the user may be interested in the dialog states that lead to a hand-off of the conversation to a human agent. Therefore, the feature may represent a probability that the dialog state will lead to a hand-off of the conversation to a human agent. Other features may include successful resolution of the user query or problem, continuance of the conversation (e.g., whether the dialog state will lead to another dialog state, etc.), access to a website or other secondary source, completion of a form, issuance of a trouble ticket, or the like. The score vector may include one or more features. In other words, the score vector may be a multidimensional score vector having many different dimensions each representing a predetermined feature.

Figure 2:
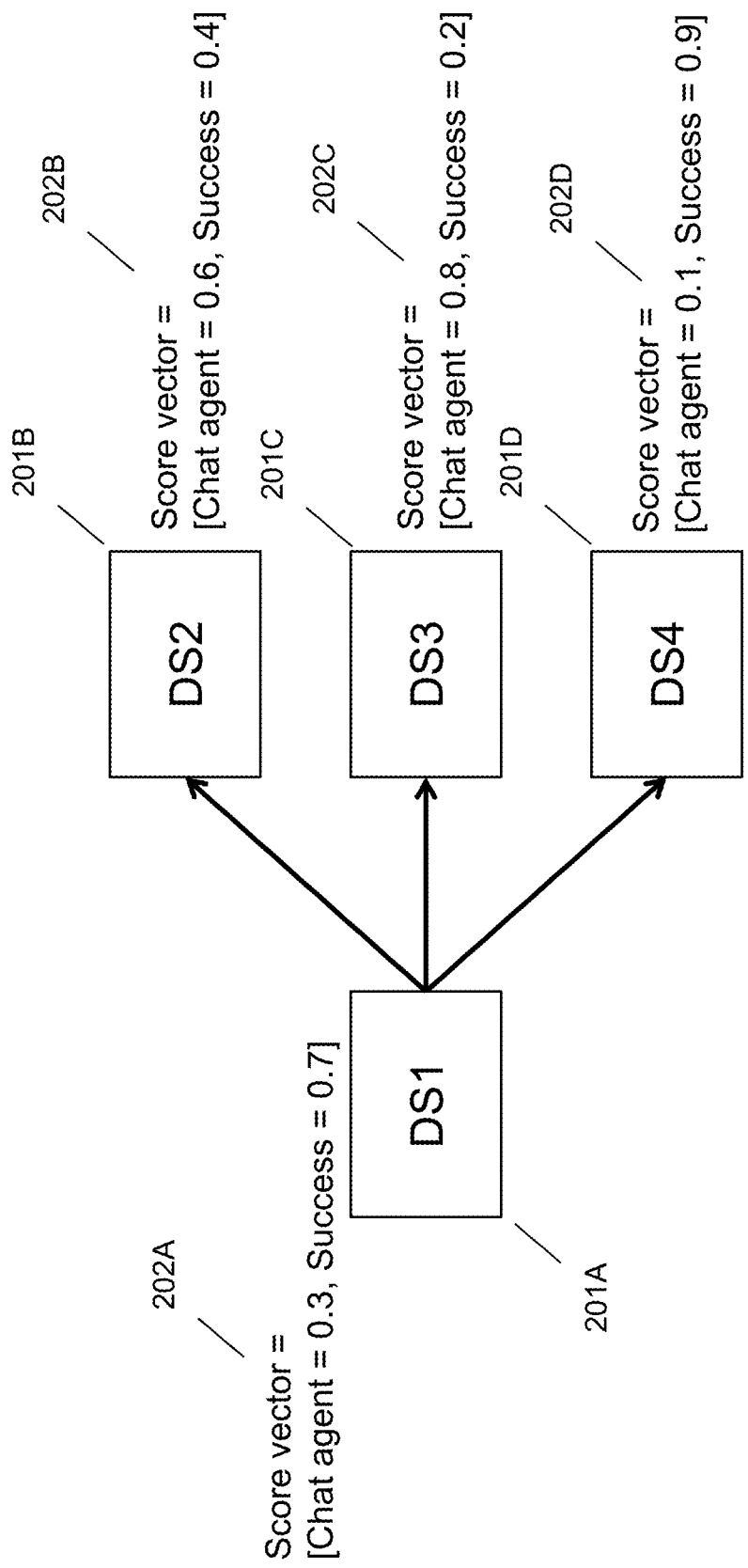
FIG. 2 illustrates an example of dialog state score vector analysis.

As an example, referring to FIG. 2, the current dialog state is represented by 201A. Possible future dialog states that may be accessed by the conversational agent, depending on the user response to the current dialog state 201A, are represented by 201B, 201C, and 201D. Each dialog state 201A-201D includes a score vector 202A-202D, respectively. In this example only two different features are illustrated for simplicity. The first feature is the probability that the dialog state will result in a hand-off to a human agent, represented by "Chat agent". The second feature is the probability that the dialog state will result in a successful resolution, represented by "Success". Each dialog state 201A-201D has a different probability for each feature within the score vector 202A-202D. Thus, one dialog state may be more desirable to the conversational agent designer than another dialog state. Using the example of FIG. 2, the dialog state DS4 201D has a score vector 202D indicating that the dialog state has a 90% probability of ending in successful resolution as opposed to a 10% probability that it will require a hand-off to a human agent. On the other hand, the dialog state DS3 201C has a score vector 202C indicating that the dialog state has a 20% probability of ending in successful resolution as opposed to an 80% probability that it will require a hand-off to a human agent. Accordingly, the dialog state DS4 201D may be more desirable than the dialog state DS3 201C. As can be seen in the example of FIG. 2, some feature probabilities may be dependent upon other feature probabilities.

Once the vector scores are generated for the grounded dialog states at 103, the system may assign score vectors to the dialog states that are not classified as grounded dialog states at 104. In other words, the system assigns a score vector to the remaining dialog states that are not already scored. To assign the score vectors to the remaining dialog states the system may extrapolate the score vector of the grounded dialog states to dialog states that the grounded dialog state is dependent upon. In other words, some dialog states may lead to the grounded dialog state. Therefore, at least a portion of the score vector of the grounded dialog state may be attributable to the dialog states leading to the grounded dialog state. Extrapolating the score vectors may include determining a statistical causality of the dialog states that the grounded dialog states is dependent upon onto the dependent grounded dialog state. In other words, the system may determine how much the dialog states leading to the grounded dialog state influence the grounded dialog state, for example, using one or more statistical analysis techniques.

Figure 3:
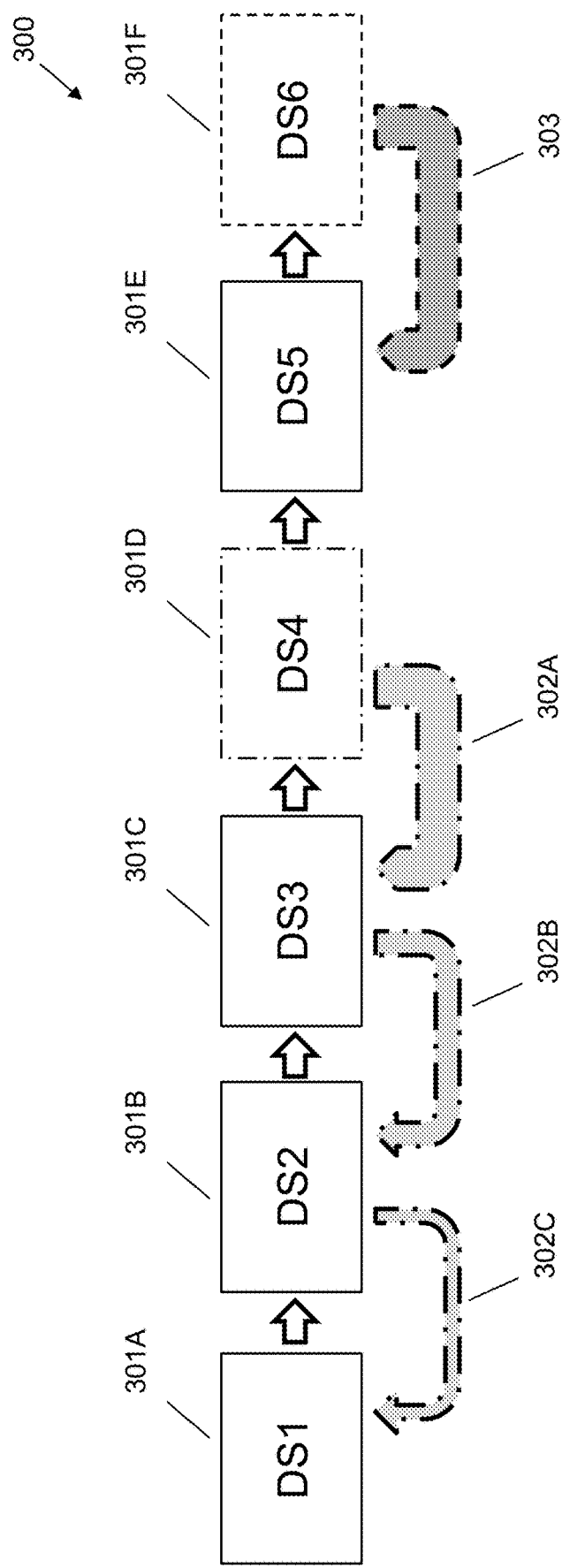
FIG. 3 illustrates an example of interpolating score vectors for dialog states using grounded dialog states.

As an example, FIG. 3 illustrates an example dialog flow 300 having six dialog states 301A-301F. Each dialog flow may have multiple grounded dialog states. In this example, the grounded dialog states (e.g., the dialog states that were classified at 103, the previously scored dialog states, etc.) are illustrated as dialog states having dashed lines 301D and 301F. In this example, dialog state DS4 301D was scored as undesirable, thereby being represented as a dashed-dotted line. Dialog state DS6 301F, on the other hand, was scored as desirable, thereby being represented as a dashed line. Working from dialog state DS6 301F, the dialog state leading to dialog state DS6 301F is dialog state DS5 301E. Therefore, at least a portion of the score vector of dialog state DS6 301F is attributable to dialog state DS5 301E. This attribution, influence, back-propagation, extrapolation, or interpolation, is represented by the arrow 303. This attribution arrow 303 is also represented by a dashed line indicating that the attribution is a positive or desirable attribution. At this point, the backwards propagation of the dialog flow reaches another grounded dialog state DS4 301D. Therefore, the attribution of the score vector from dialog state DS6 301F ends at dialog state DS5 301E. In other words, the interpolation or attribution chain is broken when another grounded dialog state is reached within the dialog flow.

The dialog state DS4 301D has been identified as undesirable. Therefore, the backwards propagation or attribution from dialog state DS4 301D will be an undesirable or negative attribution. Accordingly, the attribution arrows 302A-302C are represented by the same dashed-dotted line as the undesirable grounded dialog state DS4 301D. As the dialog states are further from the grounded dialog state the weight of influence decreases. In other words, a dialog state that is further from the grounded dialog state has less influence on the score vector of the grounded dialog state. Using the example of FIG. 3, dialog state DS1 301A has less influence on grounded dialog state DS4 301D than either dialog state DS2 301B or dialog state DS3 301C. Accordingly, the size of the influence or attribution arrow decreases as the dialog state is further from the grounded dialog state. For example, the influence arrow 302C from dialog state DS2 301B to dialog state DS1 301A is smaller than the influence arrow 302B from dialog state DS3 301C to dialog state DS2 301B, which is smaller than the influence arrow 302A from dialog state DS4 301D to dialog state DS3 301C.

The system may determine whether all dialog states have been assigned a score vector at 105. If some dialog states have not been assigned a score vector, the system may continue to assign score vectors to the remaining dialog states at 104. If, or once, all the dialog states have been assigned a score vector the system may compute an aggregate score vector for the dialog flow at 106. The aggregate vector score identifies an overall desirability of the dialog flow. The aggregate vector score may have multiple dimensions or aspects, each representing a different feature, desirability, or the like. For example, the aggregate score vector may have an aspect that is based upon the desirability of dialog states. This aspect may represent a numerical health value of the overall conversational agent. In other words, this aspect may represent whether the overall dialog flow is desirable or undesirable. Computation of this aspect may include averaging the desirability portion of the score vectors of the dialog states.

Another aspect of the aggregate score vector may correspond to the different predetermined features of the dialog states. In other words, the system may generate an aggregate score vector that identifies a frequency of occurrence of one or more particular features. To compute this component of the aggregate score vector the system may weight the score vector for a feature based upon a frequency of occurrence of the dialog state having the feature within a conversation. The frequency of occurrence may be determined or identified from the dialog logs included in the information received at 101. Once the score vectors have been weighted, the system may average the score vectors to generate an aggregated score vector. This portion of the aggregate score vector may identify how often the conversation ends in a particular feature using the designed conversational agent model.

The aggregate score vector and the score vectors individually assigned to the dialog states may be used by a user to improve the design of the conversational agent. Not only can the user identify the overall health of the conversational agent design, but the user can identify a frequency of occurrence of a particular hand-off. For example, if the user determines that the overall health of the dialog flow is lower or less desirable than the user wants, the user can identify which dialog states are contributing to the undesired aggregate score vector. Thus, the user can change the response of the conversational agent at this dialog state or the dialog states that lead to this dialog state. As another example, the user can determine if the conversational agent design is resulting features or hand-offs at a desired frequency. For example, the user may want to minimize the occurrence of hand-offs to human agents. Therefore, the user may determine if the occurrence of hand-offs to human agents is more than a desired frequency.

Additionally, by determining a frequency of occurrence of a particular feature or hand-off, the system can predict a likely outcome of the conversation and prepare for that outcome. For example, if the system identifies that a series of dialog states generally result in the access of a particular website, when that series of dialog states begins to occur or is occurring within a conversation, the system may pre-fetch the website information so that it loads or is presented to the user faster. As another example, if the system identifies that a series of dialog states generally results in a hand-off of the conversation to a human agent, when that series of dialog states begins to occur or is occurring within a conversation, the system may generate a request for a human agent early in the conversation so that the user does not have to wait for the human agent to be available when the human agent is needed. Thus, the system as described herein provides a technique for evaluating the design of a conversational agent in order to provide a better user experience.

Figure 4:
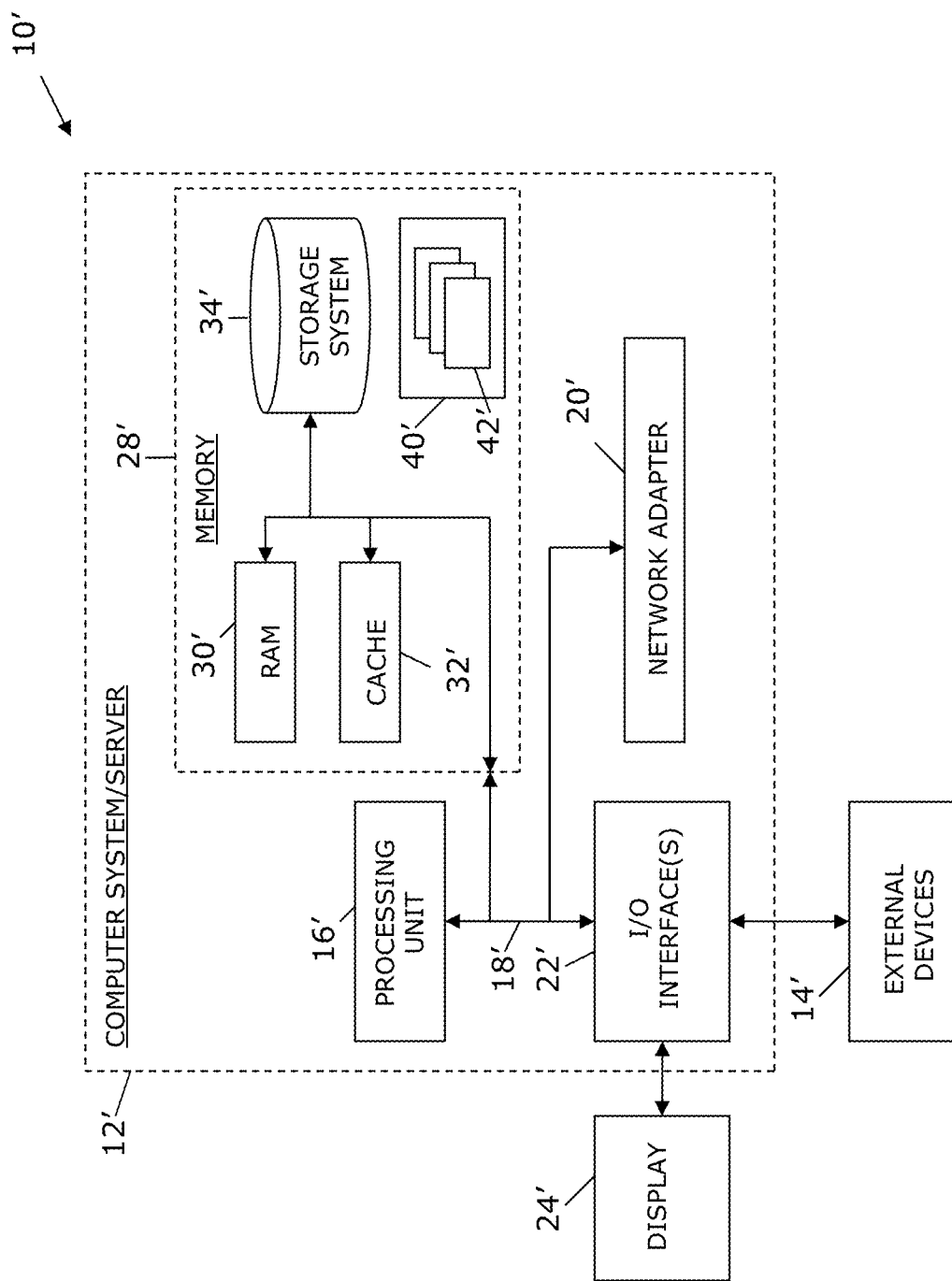
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method, comprising:
  receiving information corresponding to a dialog flow between a virtual assistant and a user, wherein the information comprises dialog logs from previous conversations between the virtual assistant and users;

identifying, from the received information, dialog states, wherein each dialog state corresponds to a possible response by the virtual assistant, wherein the identifying comprises analyzing the dialog logs and identifying responses provided by the virtual assistant;
classifying a set of the identified dialog states as grounded dialog states, wherein the classifying comprises (i) receiving scoring input representing a desirability for each of the grounded dialog states and (ii) generating a score vector, for each of the grounded dialog states, based upon the received scoring input for each of the grounded dialog states, wherein the classifying comprises classifying more than one of the dialog states as a grounded dialog state and wherein each of the grounded dialog states is separated by at least one other dialog state, wherein the grounded dialog state comprises a dialog state having a scoring input provided by another user;
assigning a score vector to each of the identified dialog states other than the grounded dialog states, wherein the assigning a score vector comprises extrapolating the score vector of a grounded dialog state to dialog states that the grounded dialog state is dependent upon; and
computing an aggregate score vector for the dialog flow by weighting the score vectors for each of the identified dialog states within the dialog flow and averaging the weighted dialog state score vectors, wherein the aggregate score vector identifies an overall desirability of the dialog flow.

2. The method of claim 1, wherein the information comprises a dialog model corresponding to the virtual assistant.

3. The method of claim 1, wherein the identifying dialog states comprises analyzing the dialog logs and classifying each response by the virtual assistant within the conversation to a dialog state.

4. The method of claim 1, wherein the desirability of a dialog state is based upon a response by a user to an output provided by the virtual assistant.

5. The method of claim 1, wherein the generating a score vector comprises combining a feature of the dialog state with the scoring input into a vector.

6. The method of claim 5, wherein a feature of a dialog state represents a probability of a predetermined response by the virtual assistant.

7. The method of claim 1, wherein the extrapolating comprises determining a statistical causality of the dialog states that the grounded dialog state is dependent upon on the dependent grounded dialog state.

8. The method of claim 1, wherein the weighting the score vectors for each dialog state is based upon a frequency of occurrence of the dialog state.

9. An apparatus, comprising:
at least one processor; and
a computer readable storage medium having computer readable program code embodied therewith and executable by the at least one processor, the computer readable program code comprising:
computer readable program code configured to receive information corresponding to a dialog flow between a virtual assistant and a user, wherein the information comprises dialog logs from previous conversations between the virtual assistant and users;
computer readable program code configured to identify, from the received information, dialog states, wherein each dialog state corresponds to a possible response by the virtual assistant, wherein the identifying comprises analyzing the dialog logs and identifying responses provided by the virtual assistant;
computer readable program code configured to classify a set of the identified dialog states as grounded dialog states, wherein the classifying comprises (i) receiving scoring input representing a desirability for each of the grounded dialog states and (ii) generating a score vector, for each of the grounded dialog states, based upon the received scoring input for each of the grounded dialog states, wherein the classifying comprises classifying more than one of the dialog states as a grounded dialog state and wherein each of the grounded dialog states is separated by at least one other dialog state, wherein the grounded dialog state comprises a dialog state having a scoring input provided by another user;
computer readable program code configured to assign a score vector to each of the identified dialog states other than the grounded dialog states, wherein the assigning a score vector comprises extrapolating the score vector of a grounded dialog state to dialog states that the grounded dialog state is dependent upon; and
computer readable program code configured to compute an aggregate score vector for the dialog flow by weighting the score vectors for each of the identified dialog states within the dialog flow and averaging the weighted dialog state score vectors, wherein the aggregate score vector identifies an overall desirability of the dialog flow.

10. A computer program product, comprising:
a computer readable storage medium having computer readable program code embodied therewith, the computer readable program code executable by a processor and comprising:
computer readable program code configured to receive information corresponding to a dialog flow between a virtual assistant and a user, wherein the information comprises dialog logs from previous conversations between the virtual assistant and users;
computer readable program code configured to identify, from the received information, dialog states, wherein each dialog state corresponds to a possible response by the virtual assistant, wherein the identifying comprises analyzing the dialog logs and identifying responses provided by the virtual assistant;
computer readable program code configured to classify a set of the identified dialog states as grounded dialog states, wherein the classifying comprises (i) receiving scoring input representing a desirability for each of the grounded dialog states and (ii) generating a score vector, for each of the grounded dialog states, based upon the received scoring input for each of the grounded dialog states, wherein the classifying comprises classifying more than one of the dialog states as a grounded dialog state and wherein each of the grounded dialog states is separated by at least one other dialog state, wherein the grounded dialog state comprises a dialog state having a scoring input provided by another user;
computer readable program code configured to assign a score vector to each of the identified dialog states other than the grounded dialog states, wherein the assigning a score vector comprises extrapolating the score vector of a grounded dialog state to dialog states that the grounded dialog state is dependent upon; and
computer readable program code configured to compute an aggregate score vector for the dialog flow by weighting the score vectors for each of the identified dialog states within the dialog flow and averaging the weighted dialog state score vectors, wherein the aggregate score vector identifies an overall desirability of the dialog flow.

11. The computer program product of claim 10, wherein the identifying dialog states comprises analyzing the dialog logs and classifying each response by the virtual assistant within the conversation to a dialog state.

12. The computer program product of claim 10, wherein the desirability of a dialog state is based upon a response by a user to an output provided by the virtual assistant.

13. The computer program product of claim 10, wherein the generating a score vector comprises combining a feature of the dialog state with the scoring input into a vector.

14. The computer program product of claim 13, wherein a feature of a dialog state represents a probability of a predetermined response by the virtual assistant.

15. The computer program product of claim 10, wherein the extrapolating comprises determining a statistical causality of the dialog states that the grounded dialog state is dependent upon on the dependent grounded dialog state.

16. The computer program product of claim 10, wherein the weighting the score vectors for each dialog state based upon a frequency of occurrence of the dialog state.

17. A method, comprising:
  accessing at least one dialog model corresponding to a digital assistant, wherein the at least one dialog model identifies a dialog flow between the digital assistant and a user, wherein the at least one dialog model identifies a plurality of dialog nodes that correspond to possible responses that can be provided by the dialog assistant;
  identifying dialog states within the dialog model, wherein the dialog states correspond to responses provided by the digital assistant;
  receiving input, from a user, scoring each of at least a portion of the identified dialog states, wherein the score for each dialog state identifies a desirability of the dialog state;
  classifying the scored dialog states as grounded dialog states, wherein the classifying comprises classifying more than one of the dialog states as a grounded dialog state and wherein each of the grounded dialog states is separated by at least one other dialog state;
  scoring, based upon the score of the grounded dialog states, each of the remaining identified dialog states, wherein the scoring comprises statistically generating a score for each of the remaining identified dialog states based upon the dependence of the grounded dialog states to each of the remaining identified dialog states; and
  generating, using the grounded dialog states, an aggregate score for the at least one dialog model by weighting the score of each dialog state based upon a frequency of occurrence of the dialog state and averaging the weighted dialog state scores, wherein the aggregate score identifies an overall desirability of the dialog flow.

* * * * *